United States Patent
Takahashi et al.

(10) Patent No.: US 12,338,152 B2
(45) Date of Patent: Jun. 24, 2025

(54) BORON REMOVAL DEVICE AND BORON REMOVAL METHOD, AND PURE WATER PRODUCTION DEVICE AND PURE WATER PRODUCTION METHOD

(71) Applicant: ORGANO CORPORATION, Tokyo (JP)

(72) Inventors: Kazushige Takahashi, Tokyo (JP); Fumio Sudo, Tokyo (JP); Yuki Nakamura, Tokyo (JP); Kenji Shibasaki, Tokyo (JP); Keisuke Sasaki, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 334 days.

(21) Appl. No.: 17/925,052

(22) PCT Filed: Mar. 30, 2021

(86) PCT No.: PCT/JP2021/013584
§ 371 (c)(1),
(2) Date: Nov. 14, 2022

(87) PCT Pub. No.: WO2021/235107
PCT Pub. Date: Nov. 25, 2021

(65) Prior Publication Data
US 2023/0183115 A1    Jun. 15, 2023

(30) Foreign Application Priority Data

May 20, 2020   (JP) .................................. 2020-087982

(51) Int. Cl.
*B01D 61/02*   (2006.01)
*B01D 61/48*   (2006.01)
(Continued)

(52) U.S. Cl.
CPC ............... *C02F 9/00* (2013.01); *B01D 61/58* (2013.01); *B01D 61/026* (2022.08); *B01D 61/48* (2013.01);
(Continued)

(58) Field of Classification Search
CPC .... C02F 9/00; C02F 1/32; C02F 1/441; C02F 1/4695; C02F 1/66; C02F 1/705;
(Continued)

(56) References Cited

U.S. PATENT DOCUMENTS 4,574,049 A * 3/1986 Pittner ................... C02F 1/441
                                                    210/639
5,766,479 A * 6/1998 Collentro ............... B01D 61/04
                                                    210/651
(Continued)

FOREIGN PATENT DOCUMENTS

CA    2766832 C  * 1/2018 ................ C02F 1/46
CN    1408653 A  * 4/2003
(Continued)

OTHER PUBLICATIONS

English Translation of publication KR 101993688, published Jun. 27, 2019. (Year: 2019).*
(Continued)

*Primary Examiner* — Joseph W Drodge
(74) *Attorney, Agent, or Firm* — GREENBLUM & BERNSTEIN, P.L.C.

(57) ABSTRACT

Provided are an apparatus for removing boron and a method for removing boron for reducing the boron concentration in water to be treated, and an apparatus and a method for producing pure water wherein the boron concentration is reduced. An apparatus for removing boron includes: a first electrodeionization device to which water to be treated is supplied; an ultraviolet oxidation device to which the water (Continued)

treated by the first electrodeionization device is supplied; an oxide removal device to which the water treated by the ultraviolet oxidation device is supplied; and a second electrodeionization device to which the water treated by the oxide removal device is supplied. A method for removing boron using the apparatus is provided. The oxide removal device is equipped with a platinum group metal catalyst, and the water that has been treated by the oxide removal device has a hydrogen peroxide concentration of less than 1 ppb.

12 Claims, 2 Drawing Sheets

(51) Int. Cl.
| | |
|---|---|
| B01D 61/58 | (2006.01) |
| C02F 1/32 | (2023.01) |
| C02F 1/44 | (2023.01) |
| C02F 1/46 | (2023.01) |
| C02F 1/66 | (2023.01) |
| C02F 1/70 | (2023.01) |
| C02F 9/00 | (2023.01) |
| C02F 1/469 | (2023.01) |
| C02F 101/10 | (2006.01) |

(52) U.S. Cl.
CPC ............ B01D 2311/06 (2013.01); C02F 1/32 (2013.01); C02F 1/441 (2013.01); C02F 1/4695 (2013.01); C02F 1/66 (2013.01); C02F 1/705 (2013.01); C02F 2101/108 (2013.01); C02F 2301/08 (2013.01)

(58) Field of Classification Search
CPC .. C02F 2101/108; C02F 2301/08; C02F 1/20; C02F 2103/04; C02F 1/325; C02F 1/42; C02F 1/58; C02F 1/725; C02F 2103/346; C02F 1/469; C02F 1/4691; B01D 61/58; B01D 61/026; B01D 61/48; B01D 2311/06; B01D 61/025; B01D 2311/04; B01D 2311/18; B01D 2311/2634; B01D 61/428; B01D 61/4281; B01D 61/44; Y02A 20/131
See application file for complete search history.

(56) References Cited

U.S. PATENT DOCUMENTS

| | | | | |
|---|---|---|---|---|
| 6,328,896 | B1* | 12/2001 | Atnoor | C02F 1/42 210/900 |
| 6,461,512 | B1* | 10/2002 | Hirayama | B01D 61/48 210/257.2 |
| 12,037,276 | B2* | 7/2024 | Takahashi | B01D 61/44 |
| 2004/0188352 | A1* | 9/2004 | Dey | B01D 61/026 210/639 |
| 2004/0245175 | A1 | 12/2004 | Godec et al. | |
| 2006/0096864 | A1* | 5/2006 | Osawa | B01D 61/58 204/632 |
| 2006/0231491 | A1* | 10/2006 | Mukhopadhyay | C02F 1/42 423/580.1 |
| 2009/0127201 | A1 | 5/2009 | Kobayashi | |
| 2016/0159671 | A1 | 6/2016 | Ikuno | |
| 2016/0221841 | A1 | 8/2016 | Fukui et al. | |
| 2017/0253499 | A1 | 9/2017 | Fuikui et al. | |
| 2017/0327396 | A1* | 11/2017 | Ikuno | B01D 61/08 |
| 2020/0017384 | A1* | 1/2020 | Fujimura | C02F 1/20 |
| 2022/0388880 | A1* | 12/2022 | Sasaki | B01D 61/08 |

FOREIGN PATENT DOCUMENTS

| | | | | |
|---|---|---|---|---|
| CN | 101374769 | A | 2/2009 | |
| CN | 105392552 | A | 3/2016 | |
| CN | 109890766 | A | 6/2019 | |
| CN | 110049952 | A | 7/2019 | |
| JP | 09-192658 | A | 7/1997 | |
| JP | 2006-051423 | A | 2/2006 | |
| JP | 2010-42324 | A | 2/2010 | |
| JP | 2016-47496 | A | 4/2016 | |
| JP | 2017-127875 | A | 7/2017 | |
| JP | 2017-140550 | A | 8/2017 | |
| KR | 101993688 | B1* | 6/2019 | ............... C02F 1/32 |
| KR | 10-2019-0089877 | A | 7/2019 | |
| TW | 201505973 | A | 2/2015 | |
| TW | 201829321 | A | 8/2018 | |
| WO | 2003/031034 | A1 | 4/2003 | |
| WO | 2015/068635 | A1 | 5/2015 | |
| WO | 2017/130454 | A1 | 8/2017 | |
| WO | 2018/198723 | A1 | 11/2018 | |
| WO | 2020/184045 | A1 | 9/2020 | |
| WO | 2022/024815 | A1 | 2/2022 | |

OTHER PUBLICATIONS

Escapenet translation of publication KR 101993688, published Jun. 27, 2019. (Year: 2019).*
English translation of Patent Publication CN 1408653A, published Apr. 9, 2003. (Year: 2003).*
Office Action dated Mar. 13, 2024 in Chinese family member application No. with English language translation.
Office Action dated Jun. 19, 2024 in Taiwanese family member Patent Application No. 110115216, with English language translation thereof.
International Search Report and Written Opinion of the International Searching Authority issued in International Patent Application No. PCT/JP2021/013584, dated May 25, 2021, along with an English translation thereof.
International Preliminary Report on Patentability of the International Searching Authority issued in International Patent Application No. PCT/JP2021/013584 dated Nov. 17, 2022, along with an English translation thereof.
Office Action dated Aug. 19, 2024 in Taiwanese family member Patent Application No. 110115216, with English language translation thereof.
Office Action dated Sep. 15, 2024 in Chinese family member application No. 202180034472.7 with partial English language translation thereof (manually corrected)(note that search report section not translated but contains the category designations ("Y"), etc., in English).
Office Action that issued in the corresponding Korean Patent Application No. 10-2022-7041398 dated May 6, 2025, along with an English translation thereof.

* cited by examiner

[Fig. 1]
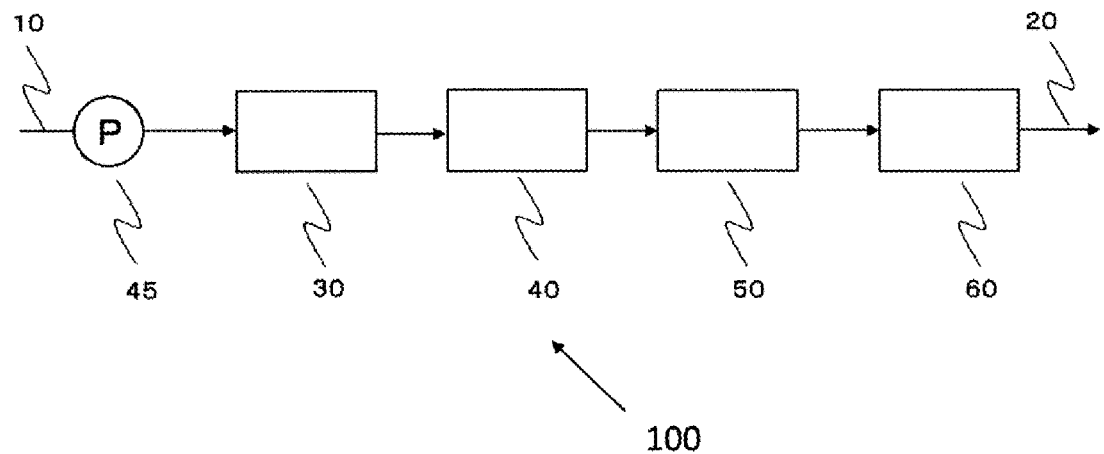
[Fig. 2]
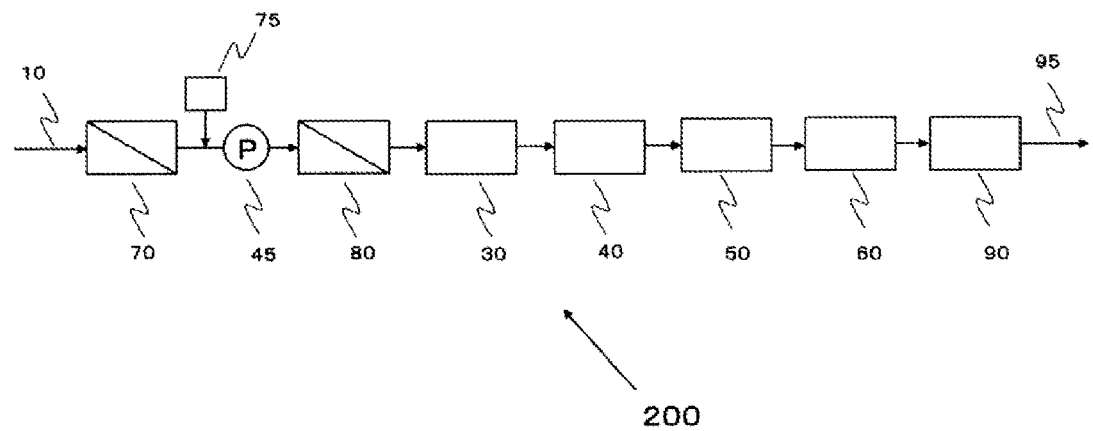
[Fig. 3]
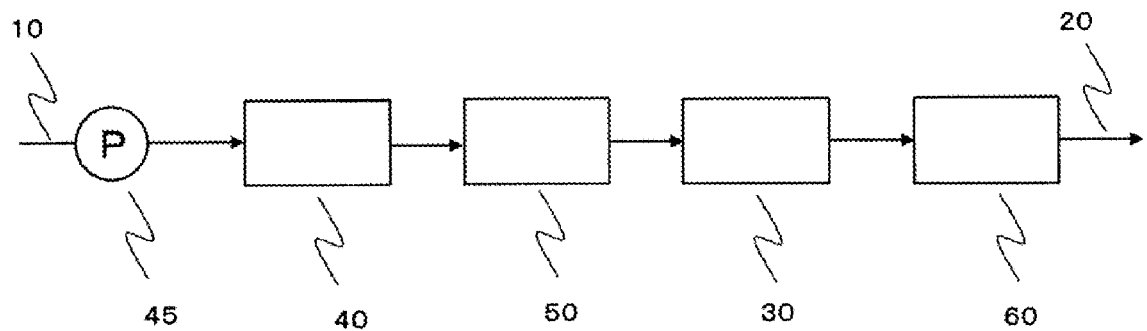

[Fig. 4]
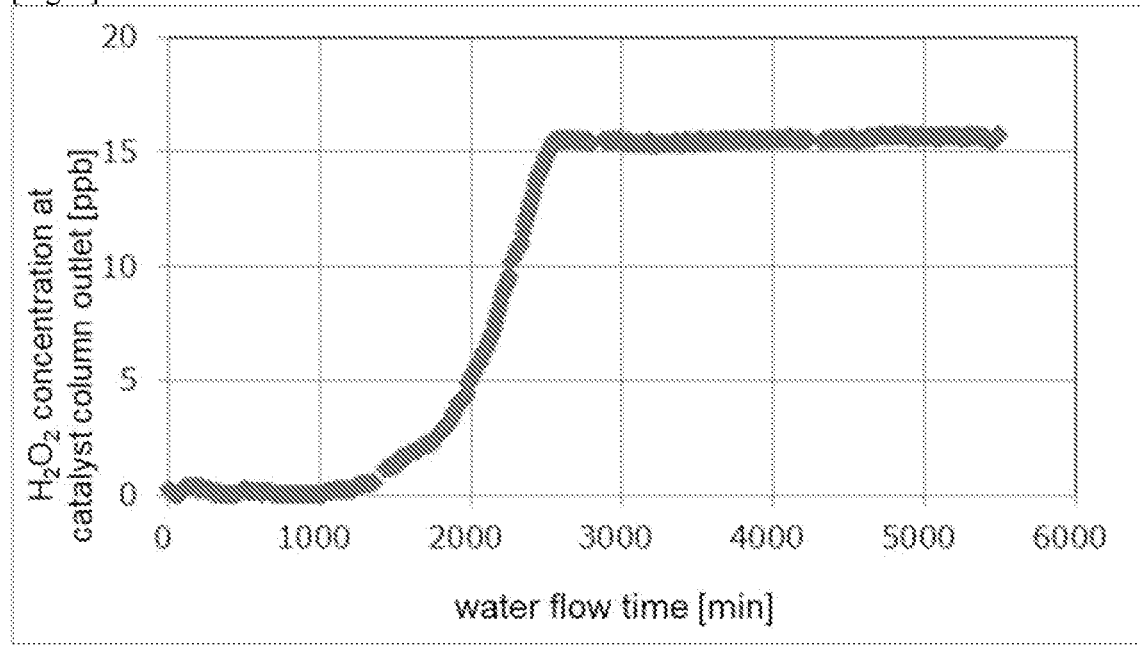
[Fig. 5]
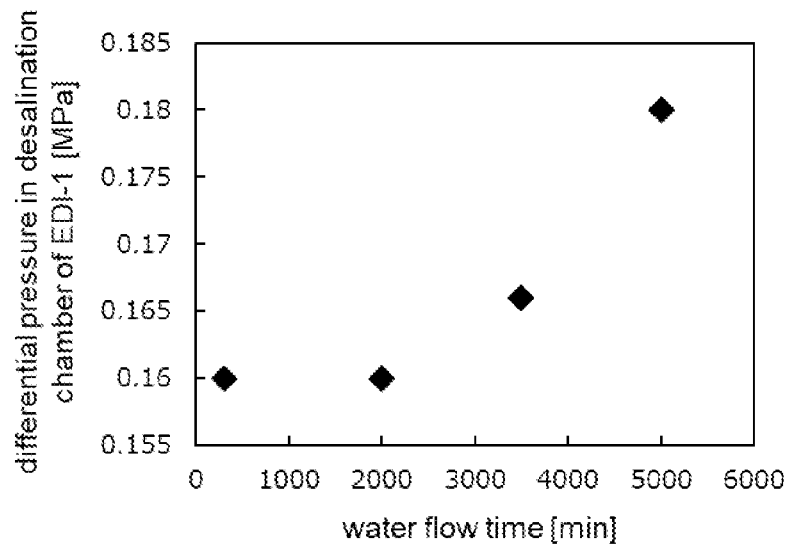

BORON REMOVAL DEVICE AND BORON REMOVAL METHOD, AND PURE WATER PRODUCTION DEVICE AND PURE WATER PRODUCTION METHOD

TECHNICAL FIELD

The present invention relates to an apparatus for removing boron, a method for removing boron, an apparatus for producing pure water, and a method for producing pure water.

BACKGROUND ART

Conventionally, pure water such as ultrapure water, from which organic substances, ion components, fine particles, bacteria, and the like are highly removed, has been used as an application for cleaning water in a manufacturing process of semiconductor devices or a manufacturing process of liquid crystal devices. In particular, when manufacturing electronic components including semiconductor devices, a large amount of pure water is used in the cleaning process, and the demand for water quality is increasing year by year.

For example, reduction of total organic carbon (TOC: Total Organic Carbon) and boron as a trace amount of impurities is required. In general, it is known that TOC components are removed by an ultraviolet oxidation treatment, and boron is removed by a reverse osmosis membrane device, a boron selective ion exchange resin, or an electrodeionization device. Patent Document 1 discloses that pretreated water is treated in the order of a reverse osmosis membrane device, an electrodeionization device, an ultraviolet oxidation device, and a boron resin mixed ion exchange device to produce primary pure water from which TOC and boron have been removed. In addition, Patent Document 2 discloses that a primary pure water system includes a high-pressure reverse osmosis membrane separation device, a degassing device, an ultraviolet oxidation device, and an ion exchange device in this order, that the high-pressure reverse osmosis membrane has a higher removal rate of weak electrolyte components and non-charged components such as boron, silica, and non-charged organic substances than a low-pressure or ultra-low-pressure reverse osmosis membrane, and that the ion exchange device may be a regenerative ion exchange device in which an electrodeionization device is connected in one or a plurality of stages in series.

PRIOR-ART DOCUMENT

Patent Document

[Patent Document 1] JP 2016-47496 A
[Patent Document 2] JP 2017-127875 A

SUMMARY OF THE INVENTION

Technical Problems

However, in the methods described in Patent Documents 1 and 2, oxidizing agents such as ozone and hydrogen peroxide generated in the ultraviolet oxidation device may oxidize and deteriorate the boron resin or the ion exchange resin in the electrodeionization device in the subsequent stage. As a result, the boron removal rate of the boron resin mixed ion exchange device and the electrodeionization device is reduced, and boron cannot be reduced to an extremely low concentration.

Therefore, an object of the present invention is to provide an apparatus for removing boron and a method for removing boron for reducing the boron concentration in water to be treated, and to provide an apparatus and a method for producing pure water wherein the boron concentration is reduced.

Means for Solving the Problems

The present inventors have found that the boron concentration can be greatly reduced by appropriately combining a plurality of electrodeionization devices, an ultraviolet oxidation device, and an oxide removal device.

That is, the present invention relates to an apparatus for removing boron and a method for removing boron using the apparatus, including: a first electrodeionization device to which water to be treated is supplied; an ultraviolet oxidation device to which the water treated by the first electrodeionization device is supplied; an oxide removal device to which the water treated by the ultraviolet oxidation device is supplied; and a second electrodeionization device to which the water treated by the oxide removal device is supplied.

Further, the present invention relates to an apparatus for producing pure water and a method for producing pure water using the apparatus, including: a low-pressure reverse osmosis membrane device to which water to be treated is supplied; a pH adjusting device for adjusting the pH of permeated water from the low-pressure reverse osmosis membrane device; a high-pressure reverse osmosis membrane device to which adjusted water in which the pH has been adjusted by the pH adjusting device is supplied; a first electrodeionization device to which permeated water from the high-pressure reverse osmosis membrane device is supplied; an ultraviolet oxidation device to which the water treated by the first electrodeionization device is supplied; an oxide removal device to which the water treated by the ultraviolet oxidation device is supplied; a second electrodeionization device to which the water treated by the oxide removal device is supplied; and a cartridge polisher to which the water treated by the second electrodeionization device is supplied.

Effect of the Invention

According to the present invention, there is provided an apparatus for removing boron and a method for removing boron capable of greatly reducing the boron concentration. Further, there is provided an apparatus for producing pure water and a method for producing pure water capable of producing high-purity pure water.

BRIEF DESCRIPTION OF THE DRAWINGS

FIG. 1 is a conceptual diagram showing a configuration of an apparatus for removing boron according to an embodiment of the present invention.

FIG. 2 is a conceptual diagram showing a configuration of an apparatus for producing pure water according to an embodiment of the present invention.

FIG. 3 is a conceptual diagram of a device used in Comparative Example 1.

FIG. 4 is a graph showing the relationship between the water flow time and the hydrogen peroxide concentration at the catalyst column outlet in Comparative Example 1.

FIG. 5 is a graph showing the relationship between the water flow time and the differential pressure in the desalination chamber of the first electrodeionization device (EDI-1) in Comparative Example 1.

DETAILED DESCRIPTION OF THE PRESENT INVENTION

Hereinafter, the present invention will be described with reference to the drawings, but the present invention is not limited to the configuration described in the drawings.

In FIG. 1, an apparatus for removing boron 100 according to the present invention includes a first electrodeionization device (EDI-1) 30 to which water to be treated 10 is supplied via a pump 45; an ultraviolet oxidation device 40 to which the water treated by the electrodeionization device 30 is supplied; an oxide removal device (catalyst column) 50 to which the water treated by the ultraviolet oxidation device 40 is supplied; and a second electrodeionization device (EDI-2) 60 to which the water treated by the oxide removal device (catalyst column) 50 is supplied.

Then, ion components and boron in water to be treated 10 are removed by the first electrodeionization device 30, and then the treated water is supplied to the ultraviolet oxidation device 40, and organic substances (TOC components or the like) are decomposed. In the ultraviolet oxidation device 40, organic substances are decomposed to generate oxidizing substances such as hydrogen peroxide and ozone. These oxidizing substances cause deterioration of the ion exchange resin in the second electrodeionization device 60, which will be described later. Therefore, the water treated by the ultraviolet oxidation device 40 is supplied to the second electrodeionization device 60 for treatment after oxidizing substances are removed by the oxide removal device (catalyst column) 50, whereby the treated water 20 is obtained.

The ultraviolet oxidation device 40 used in the present invention is installed for the purpose of removing organic substances. Therefore, it is preferable to use an ultraviolet oxidation device that performs ultraviolet oxidation treatment by irradiating ultraviolet rays including a wavelength of 185 nm or less. Although the subsystem (a secondary pure water system) may also be equipped with an ultraviolet oxidation device, for example, in a facility where the TOC concentration of ultrapure water is required to be 1 µg/L or less, the energy cost as a whole can be reduced by installing the ultraviolet oxidation device in a primary pure water system having a relatively high dissolved oxygen (DO) concentration. In addition, the presence of dissolved oxygen can be expected to generate hydroxyl radicals and hydrogen peroxide from the dissolved oxygen by ultraviolet irradiation, thereby improving the TOC decomposition efficiency.

When the ultraviolet oxidation device 40 is installed before the first electrodeionization device 30, hydrogen peroxide, which is an oxidizing substance generated by the polymerization of radicals generated in the ultraviolet oxidation device, may deteriorate the ion exchange resin in the first electrodeionization device and cause performance degradation. Therefore, the ultraviolet oxidation device 40 is installed at a stage subsequent to the first electrodeionization device 30. Further, by installing the ultraviolet oxidation device 40 before the second electrodeionization device (EDI-2) 50, it is possible to reduce the load on the cartridge polisher (CP) in the subsystem and obtain highly pure water.

The oxide removal device (catalyst column) 50 is filled with a catalyst capable of decomposing oxidizing substances. As a result, oxidizing substances generated in the ultraviolet oxidation device are decomposed by the catalyst, and deterioration of the ion exchange resin in the second electrodeionization device described later is prevented. The hydrogen peroxide concentration of the treated water obtained from the oxide removal device is preferably less than 1 ppb. As the catalyst, it is preferable to use a platinum group metal catalyst having a small amount of eluate. As used herein, the term "platinum group metal" refers to ruthenium (Ru), rhodium (Rh), palladium (Pd), osmium (Os), iridium (Ir), and platinum (Pt), and one of them may be used alone or two or more of them may be used in combination. Among these platinum group metals, Pt, Pd and the like can be preferably used, and from the viewpoint of cost and the like, Pd is preferable. Further, as a support to be used, an anion exchanger is desirable. The anion exchanger may be a granular anion exchange resin, or may be a monolithic organic porous anion exchanger in which the anion exchange resin is molded as a single unit. Monolithic organic porous anion exchangers which can be used here are described, for example, in JP 2002-306976 A and JP 2009-62512 A. Supporting the platinum group metal catalyst on the anion exchanger is effective in exhibiting a high catalytic ability and reducing the eluate from the catalyst. The ionic form of the strongly basic anion exchange resin is preferably OH form, and the catalyst is more preferably the strongly basic anion exchange resin in OH form on which palladium (Pd) is supported.

The second electrodeionization device 60 removes organic substances and ionic components that have not been treated by the ultraviolet oxidation device 40. The second electrodeionization device 60 may be the same as or different from the first electrodeionization device 30.

Next, an apparatus for producing pure water according to the present invention will be described. In FIG. 2, an apparatus for producing pure water 200 according to the present invention includes a low-pressure reverse osmosis membrane device 70 to which water to be treated 10 is supplied; a pH adjusting device 75 to which permeated water from the low-pressure reverse osmosis membrane device 70 is supplied; a high-pressure reverse osmosis membrane device 80 to which adjusted water in which the pH has been adjusted by the pH adjusting device 75 is supplied via a pump 45; a first electrodeionization device (EDI-1) 30 to which permeated water from the high-pressure reverse osmosis membrane device 80 is supplied; an ultraviolet oxidation device 40 which performs an ultraviolet oxidation treatment on the water treated by the first electrodeionization device 30; an oxide removal device (catalyst column) 50 which treats the water treated by the ultraviolet oxidation device 40; a second electrodeionization device (EDI-2) 60 to which the water treated by the catalyst column 50 is supplied; and a cartridge polisher (CP) 90 to which the water treated by the second electrodeionization device 60 is supplied.

Then, suspended substances such as ion components and organic substances in water to be treated 10 is removed by the low-pressure reverse osmosis membrane device 70, and then permeated water is preferably adjusted to pH=5.0 to 9.0, more preferably pH=5.5 to 8.5 by the pH adjusting device 75. Thereafter, adjusted water in which the pH has been adjusted is treated with the high-pressure reverse osmosis membrane device 80 and the first electrodeionization device (EDI-1) 30 to efficiently remove boron. Total organic carbon (TOC) components remaining in the treated water are decomposed into organic acids and carbon dioxide by the ultraviolet (UV) oxidation device 40. On the other hand, the ultraviolet oxidation device 40 decomposes total organic carbon (TOC) components to generate oxidizing substances such as hydrogen peroxide and ozone. Therefore, after removing these oxidation substances in the catalyst column 50 provided in the subsequent stage of the ultraviolet oxidation device 40, ion exchange treatment is performed by the second electrodeionization device 60, and finally pure water 95 is produced. In semiconductor manufacturing or the like, pure water 95 is supplied as primary pure water to a subsystem to produce ultrapure water.

Next, the reverse osmosis membrane device used in the present invention will be described. The reverse osmosis membrane device is composed of a reverse osmosis membrane element composed of members such as a reverse osmosis membrane and a flow channel material, and one or more pressure vessels (vessels) loaded with one or more reverse osmosis membrane element. By pumping water to be treated to the vessel loaded with the reverse osmosis membrane element, the amount of permeated water corresponding to the effective pressure is obtained from the vessel. In addition, water that does not permeate through the reverse osmosis membrane element and is concentrated in the vessel is discharged from the vessel as concentrated water. The shape of the reverse osmosis membrane element is not particularly limited, and a tubular type, a spiral type, and a hollow-fiber-type can be used. When using multiple reverse osmosis membrane elements within the same vessel, each reverse osmosis membrane element is connected in series. When using a plurality of vessels in the reverse osmosis membrane device, the vessels can be installed in parallel or in series. For example, water to be treated which is transferred by pressure may be supplied to a plurality of vessels installed in parallel, and permeated water and concentrated water of each vessel may be combined and discharged from the device. Furthermore, a vessel configuration such as a so-called Christmas tree system in which concentrated water discharged from each vessel is supplied to another vessel can be used.

The configuration of the reverse osmosis membrane element and the configuration of the vessel in the reverse osmosis membrane device can be appropriately designed and selected according to the required permeate water quality, amount of permeated water, water recovery rate, footprint, and the like.

The water recovery rate of each reverse osmosis membrane device used in the present invention is calculated by the ratio of water to be treated supplied to each reverse osmosis membrane device and permeated water obtained by each reverse osmosis membrane device. That is, the water recovery rate of each reverse osmosis membrane device= (the amount of permeated water obtained by each reverse osmosis membrane device)/(the amount of water to be treated supplied to each reverse osmosis membrane device). Appropriate water recovery rate can be designed and selected depending on the quality of water to be treated, the required permeate water quality, amount of permeated water, water recovery rate, footprint, and the like. Although there is no particular limitation on the water recovery rate, the water recovery rate of the low-pressure reverse osmosis membrane device is preferably 50 to 90%, more preferably 65 to 85%, and the water recovery rate of the high-pressure reverse osmosis membrane device is preferably 80 to 99%, more preferably 85 to 95%. In particular, the water recovery rate of the high-pressure reverse osmosis membrane device can be set to a high value because the impurity concentration in water to be treated is reduced by the low-pressure reverse osmosis membrane treatment.

In the reverse osmosis membrane device, chemicals (for example, reducing agents, pH adjusting agents, scale dispersants, disinfectants, or the like) used in general reverse osmosis membrane devices can be used.

As the reverse osmosis membrane used in the low-pressure reverse osmosis membrane device (BWRO device), a low-pressure membrane and an ultra-low-pressure membrane that can be operated at a relatively low pressure are preferably used.

As the low-pressure reverse osmosis membrane and the ultra-low-pressure reverse osmosis membrane, those having a permeation flux of pure water at an effective pressure of 1 MPa and a water temperature of 25° C. of preferably 0.65 to 1.8 m/d and more preferably 0.65 to 1.0 m/d can be used.

Here, the permeation flux is obtained by dividing the amount of permeated water by area of a reverse osmosis membrane. An "effective pressure" is an effective pressure acting on the membrane obtained by subtracting an osmotic pressure difference and a secondary side pressure from an average operating pressure as described in JIS K3802:2015 "Technical terms for membranes and membrane processes." The average operating pressure is an average value of the pressure of the membrane supplied water (operating pressure) and the pressure of concentrated water (concentrated water outlet pressure) on a primary side of the reverse osmosis membrane, and is expressed by the following formula:

Average operating pressure=(operating pressure+ concentrated water outlet pressure)/2

Permeation flux per effective pressure of 1 MPa can be calculated from the information in the membrane manufacturer's catalogue, e.g., the amount of permeated water, membrane area, water recovery rate at the time of assessment, NaCl density, etc. In addition, when a plurality of reverse osmosis membranes having the same permeation flux are loaded in one or more pressure vessels, the permeation flux of the loaded membrane can be calculated based on the information such as an average operating pressure/a secondary side pressure of the pressure vessel, a water quality of water to be treated, the amount of permeated water, and the number of membranes.

Examples of the low-pressure and ultra-low-pressure reverse osmosis membrane include ES series (ES15-D8, ES20-U8) (trade name) manufactured by Nitto Denko Corporation; ESPA series (ESPAB, ESPA2, ESPA2-LD-MAX) (trade name) and CPA series (CPA5-MAX, CPA7-LD) (trade name) manufactured by HYDRANAUTICS; TMG series (TMG20-400, TMG20D-440) (trade name) and TM700 series (TM720-440, TM720D-440) (trade name) manufactured by Toray Industries, Inc.; and BW series (BW30HR, BW30XFR-400/34i), SG series (SG30LE-440, SG30-400) (trade name), and FORTILIFE CR100 (trade name) manufactured by Dow Chemical Company.

The definition of "high-pressure" in the high-pressure reverse osmosis membrane device (SWRO device) used in the present invention can be roughly defined as one that exhibits the following properties. That is, the permeation flux of pure water at the effective pressure of 1 MPa and water temperature of 25° C. is 0.2 to 0.65 m/d. The effective pressure of the high-pressure reverse osmosis membrane is preferably 1.5 to 2.0 MPa. By setting the effective pressure to 1.5 MPa or more, the boron inhibition rate of the high-pressure reverse osmosis membrane can be sufficiently increased. Incidentally, by setting the effective pressure to 2.0 MPa or more, the boron inhibition rate can be further improved, but it is required to increase the withstand pressure of the device, which may increase the equipment cost.

Examples of the high-pressure reverse osmosis membrane include the SWC series (SWC4, SWC5, SWC6) (trade name) manufactured by HYDRANAUTICS; TM800 series (TM820V, TM820M) (trade name) manufactured by Toray Industries, Inc.; and SW series (SW30HRLE, SW30ULE) (trade name) manufactured by Dow Chemical Company.

As described above, by providing the low-pressure reverse osmosis membrane device 70 and the high-pressure reverse osmosis membrane device 80 before the first electrodeionization device 30, the boron concentration in the treated water can be further reduced.

Next, the electrodeionization device (EDI) used in the present invention will be described. EDI is a device having a desalination chamber partitioned by an ion exchange membrane and filled with ion exchangers; a concentration chamber for concentrating the ions desalinated in the desalination chamber; and an anode and a cathode for conducting an electric current. EDI is also a device that simultaneously performs deionization (desalination) treatment of water to be treated by the ion exchangers and regeneration treatment of the ion exchangers by operating the device by conducting an electric current. The water to be treated passed through the EDI is desalinated by the ion exchangers filled in the desalination chamber and discharged outside of the EDI as EDI-treated water. Similarly, concentrated water in which ions are concentrated is discharged outside as EDI-concentrated water.

The water recovery rate of the EDI is calculated by the amount of water to be treated supplied to the EDI and the amount of the treated water obtained. That is, the water recovery rate of EDI=(the amount of EDI-treated water)/(the amount of water to be treated by the EDI). The water recovery rate of the EDI is not particularly limited, but is preferably 90 to 95%.

The water recovery rate of the RO-EDI (reverse osmosis membrane device-electrodeionization device) system is calculated by the ratio of the amount of water to be treated supplied to the RO and the amount of the treated water obtained by the EDI. That is, the water recovery rate of the RO-EDI system=the amount of EDI-treated water/the amount of water to be treated by the RO. The water recovery rate of the present RO-EDI system is not particularly limited, but is preferably 80 to 99%, and more preferably 85 to 95%. In the present RO-EDI system, while recovering the concentrated water from the high-pressure reverse osmosis membrane device and EDI-concentrated water, the components do not concentrate in the system, so a high water recovery rate of the system can be achieved.

The cartridge polisher (CP) 90 is a non-regenerative ion exchange device filled with ion exchangers, and removes organic acids and carbon dioxide generated by the ultraviolet oxidation device. Although the subsystem may include a cartridge polisher, the CP according to the present invention can prevent the inflow of organic acids or carbon dioxide into the ultraviolet oxidation device of the subsystem. Therefore, the concentration of TOC to be decomposed by the ultraviolet oxidation device of the subsystem can be reduced, and the energy cost can be reduced. In addition, since the ion load on the CP can be reduced, the exchange frequency of the CP can be reduced.

A degassing membrane device (not shown) may be provided between the high-pressure reverse osmosis membrane device 80 and the first electrodeionization device 30. By providing the degassing membrane device, the carbonic acid load on the electrodeionization device (EDI) can be reduced, so that it is expected that the boron removal rate can be improved by removing the coexisting ions. In addition, the carbonic acid load on the oxidation removal device can be reduced, and the ionic form of the strongly basic anion exchange resin used in the oxide removal device can be maintained in the OH form, so that the ability to remove oxidizing substances can be maintained over a long period of time.

Furthermore, if a large excess of DO is present, the DO becomes a radical scavenger for the ultraviolet oxidation device and the TOC decomposition efficiency decreases. Therefore, a DO adjusting mechanism such as controlling the degree of vacuum and the sweep gas flow rate on the gas side of the degassing membrane device may be provided.

Examples of water to be treated used in the present invention include, but are not limited to, industrial water, groundwater, surface water, tap water, seawater, seawater desalinated water obtained by desalinating seawater by reverse osmosis or evaporation, sewage, sewage treated water, various wastewater, for example, wastewater used in a semiconductor manufacturing process, and mixed water thereof. As the component of water to be treated, it is preferable to satisfy at least any one or more of conductivity of 10 to 1000 μS/cm, TDS (total soluble substance) of 5 to 500 ppm, and boron concentration of 10 ppb to 10 ppm. When the component of water to be treated does not satisfy these conditions, it is preferable to perform pretreatment such as coagulation precipitate treatment, filtration treatment, softening treatment, decarboxylation treatment, activated carbon treatment, and the like.

The water quality of the treated water (permeated water) of the high-pressure reverse osmosis membrane device obtained in the present invention preferably satisfies a conductivity of 2 μS/cm or less, a sodium concentration of 200 ppb or less, or both. When the sodium concentration of SWRO permeated water (EDI-feed water) is higher, the counter anions also leak out of the SWRO along with the sodium. Therefore, the selectivity of boron in the ion exchange resin filled in the EDI decreases, and the boron in the EDI-treated water cannot be sufficiently reduced. The water quality of pure water obtained in the present invention is not particularly limited, and examples thereof include a specific resistance of 17 MΩ·cm or more, a boron concentration of 50 ppt or less, a silica concentration of 50 ppt or less, and a TOC concentration of 5 ppb or less.

EXAMPLES

Hereinafter, the present invention will be described in more detail with reference to Examples, but the present invention is not limited to Examples.

Example 1

A water flow test was conducted for about 2000 hours using the apparatus shown in FIG. 1 for 100 L/h of water to be treated having an inorganic-carbon (IC: Inorganic Carbon) concentration of 300 ppb, an ionic-silica concentration of 23 ppb, a boron concentration of 14 ppb, a TOC concentration of 13 ppb, and a hydrogen peroxide concentration of <1 ppb. EDI-XP (trade name, manufactured by ORGANO CORPORATION) was used for both the first electrodeionization device (EDI-1) and the second electrodeionization device (EDI-2) and the water recovery rates were set to 90%. The operating current value was set to 5A. JPW (manufactured by Nippon Photo Science Co., Ltd.) was used as an ultraviolet (UV) oxidation device. The oxide removal device (catalyst column) used was a cylindrical container (inner diameter: 25 mm, height: 600 mm) filled with 200 mL (layer height: about 400 mm) of catalyst resin. The catalyst resin used had a Pd-supported amount of 100 mg-Pd/L-R (gel-type, OH form: >99%). The water quality at each outlet of EDI-1, UV oxidation device, catalyst column, and EDI-2 is shown in Table 1.

Here, focusing on the hydrogen peroxide concentration, it was <1 ppb in water to be treated and at the EDI-1 outlet, but increased to 25 ppb at the UV oxidation device outlet. This is thought to be due to the generation of hydrogen peroxide during the polymerization of OH radicals generated by the UV oxidation device and during the decomposition of TOCs which had been contained at 9 ppb at EDI-1 outlet. The hydrogen peroxide is decomposed in the catalyst column and has a value of less than 1 ppb at the catalyst column outlet. This indicates that little hydrogen peroxide flowed into EDI-2 and boron and TOCs were removed without being affected by hydrogen peroxide. This is also supported by the fact that the differential pressure in the desalination chamber of EDI-1 and EDI-2 is the same 0.16 MPa as at the beginning of the water flow.

When the ionic form of the catalyst before and after the water flow were analyzed, the proportion of OH form before the water flow was >99%, and the proportion of OH form after the water flow was 97%, and no significant difference was observed.

TABLE 1

| items | water to be treated | EDI-1 outlet | UV oxidation device outlet | catalyst column outlet | EDI-2 outlet |
|---|---|---|---|---|---|
| boron concentration | 14 ppb | <0.05 ppb | <0.05 ppb | <0.05 ppb | <0.05 ppb |
| silica concentration | 23 ppb | <0.05 ppb | <0.05 ppb | <0.05 ppb | <0.05 ppb |
| $H_2O_2$ concentration | <1 ppb | <1 ppb | 25 ppb | <1 ppb | <1 ppb |
| TOC concentration | 13 ppb | 9 ppb | 4 ppb | — | 2 ppb |
| IC concentration | 300 ppb | <1 ppb | 3 ppb | — | <1 ppb |
| conductivity (µS/cm) specific resistance (MΩ · cm) | 3 µS/cm | >17 MΩ · cm | — | — | >18 MΩ · cm |
| differential pressure in the desalination chamber of EDI | — | 0.16 MPa | — | — | 0.16 MPa |

Comparative Example 1

A water flow test for 5000 minutes was conducted under the same conditions as in Example 1 except that the apparatus shown in FIG. 3 was used. The water quality at each outlet of EDI-1, UV oxidation device, catalyst column, and EDI-2 is shown in Table 2.

The differential pressure in the desalination chamber of EDI-1 increased from 0.16 MPa at the beginning of the water flow to 0.18 MPa. In addition, the hydrogen peroxide concentration was 16 ppb at EDI-1 inlet (catalyst column outlet) and 12 ppb at EDI-1 outlet, indicating that hydrogen peroxide was consumed inside EDI-1. That is, it is suggested that the ion exchange resin in EDI-1 may have been oxidized and deteriorated.

TABLE 2

| items | water to be treated | UV oxidation device outlet | catalyst column outlet | EDI-1 outlet | EDI-2 outlet |
|---|---|---|---|---|---|
| boron concentration | 14 ppb | 14 ppb | 14 ppb | — | |
| silica concentration | 23 ppb | 23 ppb | 23 ppb | — | |
| $H_2O_2$ concentration | <1 ppb | 29 ppb | 16 ppb | 12 ppb | |
| TOC concentration | 13 ppb | 4 ppb | 5 ppb | 4 ppb | |
| IC concentration | 300 ppb | — | — | — | |
| conductivity (µS/cm) specific resistance (MΩ · cm) | 3 µS/cm | — | — | — | |
| differential pressure in the desalination chamber of EDI | — | — | — | 0.18 MPa | |

In addition, FIG. 4 and FIG. 5 respectively show the changes in the hydrogen peroxide concentration at the outlet of the catalyst column and the differential pressure in the desalination chamber of EDI-1 during the water flow in Comparative Example 1. As can be seen from FIG. 4, the hydrogen peroxide removal performance of the catalyst tended to greatly decrease with the passage of water. Further, as can be seen from FIG. 5, the differential pressure in the desalination chamber of EDI began to rise after 2000 minutes when hydrogen peroxide began to leak to the outlet of the catalyst column, and an increase of 0.006 MPa was observed between 2000 minutes and 3500 minutes and an increase of 0.014 MPa was observed between 3500 minutes and 5000 minutes. After 2000 minutes, the differential pressure increased at an accelerated rate, so there was a possibility that the withstand pressure of the EDI device would be exceeded even if the operation was continued. In addition, due to insufficient pressure of the supplied water, it was considered that the target amount of water could not be passed and therefore, it was judged that it could not be applied to the actual system, and the operation was stopped.

Analysis of the ionic form of the catalyst at the time of stopping water flow revealed that the percentage of OH form before water flow was >99%, whereas the percentage of OH form after water flow decreased to 85%. That is, it can be seen that the ionic form of the catalyst could no longer maintain the OH form, the reaction rate decreased, and hydrogen peroxide began to leak.

As described above, in the apparatus for removing boron of the present invention, the boron concentration of water to be treated can be stably reduced over 2000 hours by appropriately combining a plurality of EDIs, an ultraviolet oxidation device, and an oxide removal device. On the other hand, in Comparative Example 1, it was found that even a mere 5000 minutes of operation interfered with the removal of boron.

EXPLANATIONS OF LETTERS OR NUMERALS

10 Water to be treated
20 Treated water
30 First electrodeionization device (EDI-1)
40 Ultraviolet oxidation device (UV)
45 Pump
50 Oxide removal device (catalyst column)
60 Second electrodeionization device (EDI-2)
70 Low-pressure reverse osmosis membrane device (BWRO)
75 pH adjusting device
80 High-pressure reverse osmosis membrane device (SWRO)
90 Cartridge polisher (CP)
95 Pure water
100 Apparatus for removing boron
200 Apparatus for producing pure water

The invention claimed is:

1. An apparatus for removing boron, comprising:
  a first electrodeionization device to which water to be treated is supplied;
  an ultraviolet oxidation device to which the water treated by the first electrodeionization device is supplied;
  an oxide removal device to which the water treated by the ultraviolet oxidation device is supplied; and
  a second electrodeionization device to which the water treated by the oxide removal device is supplied.

2. The apparatus for removing boron according to claim 1, wherein the oxide removal device comprises a platinum group metal catalyst.

3. The apparatus for removing boron according to claim 1, wherein
  the oxide removal device comprises a platinum group metal catalyst that is supported on an anion exchanger, and
  the hydrogen peroxide concentration of the water treated by the oxide removal device is less than 1 ppb.

4. An apparatus for producing pure water, comprising:
  a first reverse osmosis membrane device to which water to be treated is supplied;
  a pH adjusting device for adjusting the pH of permeated water from the first reverse osmosis membrane device;
  a second reverse osmosis membrane device to which adjusted water in which the pH has been adjusted by the pH adjusting device is supplied;
  a first electrodeionization device to which permeated water from the second reverse osmosis membrane device is supplied;
  an ultraviolet oxidation device to which the water treated by the first electrodeionization device is supplied;
  an oxide removal device to which the water treated by the ultraviolet oxidation device is supplied;
  a second electrodeionization device to which the water treated by the oxide removal device is supplied; and
  a cartridge polisher to which the water treated by the second electrodeionization device is supplied.

5. The apparatus for producing pure water according to claim 4,
  further comprising a pump for the supplying the adjusted water to the second reverse osmosis membrane device;
  wherein the pH of the permeated water is adjusted to from 5.0 to 9.0 by the pH adjusting device.

6. The apparatus for producing pure water according to claim 4, wherein the oxide removal device comprises a platinum group metal catalyst.

7. A method for removing boron, comprising:
  (a) supplying water to be treated to a first electrodeionization device for treatment;
  (b) supplying the treated water from the first electrodeionization device to an ultraviolet oxidation device for treatment;
  (c) removing oxide by supplying the treated water from the ultraviolet oxidation device to an oxide removal device; and
  (d) supplying the treated water from the oxide removal device to a second electrodeionization device for treatment.

8. The method according to claim 7, wherein the removal of the oxide is performed by a platinum group metal catalyst.

9. The method according to claim 7, wherein during the removal of the oxide, the oxide is removed such that the hydrogen peroxide concentration is less than 1 ppb.

10. A method for producing pure water comprising:
  (a) supplying water to be treated to a first reverse osmosis membrane device for treatment;
  (b) supplying permeated water from the first reverse osmosis membrane device to a pH adjusting device to adjust the pH;
  (c) supplying adjusted water in which the pH has been adjusted by the pH adjusting device to a second reverse osmosis membrane device for treatment;
  (d) supplying permeated water from the second reverse osmosis membrane device to a first electrodeionization device for treatment;

(e) supplying the treated water from the first electrodeionization device to an ultraviolet oxidation device for treatment;

(f) removing oxide by supplying the treated water from the ultraviolet oxidation device to an oxide removal device;

(g) supplying the treated water from the oxide removal device to a second electrodeionization device for treatment; and (h) supplying the treated water from the second electrodeionization device to a cartridge polisher for treatment.

11. The method according to claim 10, wherein during the supplying of permeated water, the pH of the permeated water is adjusted to from 5.0 to 9.0.

12. The method according to claim 10, wherein during the removing of the oxide, a catalyst used to remove the oxide is a platinum group metal catalyst.

\* \* \* \* \*